United States Patent [19]

Shafer et al.

[11] Patent Number: 5,781,787
[45] Date of Patent: Jul. 14, 1998

[54] PARALLEL PROGRAM EXECUTION TIME WITH MESSAGE CONSOLIDATION

[75] Inventors: Stephen Ray Shafer, Endicott; Kanad Ghose, Vestal, both of N.Y.

[73] Assignee: Lockheed Martin Corporation, Bethesda, Md.

[21] Appl. No.: 426,805

[22] Filed: Apr. 21, 1995

[51] Int. Cl.$^6$ .................................................. G06F 7/00
[52] U.S. Cl. .................................................. 395/800; 395/566
[58] Field of Search ................................ 395/800, 566

[56] References Cited

U.S. PATENT DOCUMENTS

| | | | |
|---|---|---|---|
| 4,920,484 | 4/1990 | Ranade | 370/94.1 |
| 4,984,235 | 1/1991 | Hillis et al. | 370/60 |
| 5,006,978 | 4/1991 | Neches | 364/200 |
| 5,046,000 | 9/1991 | Hsu | 364/200 |
| 5,072,444 | 12/1991 | Breeden et al. | 370/94.1 |
| 5,117,420 | 5/1992 | Hillis et al. | 370/60 |
| 5,133,053 | 7/1992 | Johnson et al. | 395/200 |
| 5,202,987 | 4/1993 | Bayer | 395/650 |
| 5,276,899 | 1/1994 | Neches | 395/800 |
| 5,561,802 | 10/1996 | Orimo | 395/700 |

FOREIGN PATENT DOCUMENTS 365745  2/1990  European Pat. Off. .

OTHER PUBLICATIONS

"Scheme For Message–Time Tradeoff For Combining Data In Message–Passing Systems"–Author A. and S. Kipnis, Apr. 1993, vol. 36 No. 04, IBM Technical Disclosure Bulletin.

"Optimizing Data Synchronizations On Distributed Memory Architectures", Author Ko–Yank Wang 1991 International Conference On Parallel Processing.

*Primary Examiner*—Eric Coleman
*Attorney, Agent, or Firm*—William H. Steinberg; Mark A. Wurm

[57] ABSTRACT

In distributed memory multiprocessors, communication between processing elements (PEs) can have a significant impact on the overall computation time. In addition, contention for the communication links can often make PEs wait even longer for a message than would normally be required. Because of this, it is important to minimize the effects of inter-processor communication time. The present invention reduces the execution time of a parallel program by merging messages (also called message combining, or message consolidation) after the program has already been partitioned and scheduled onto the PEs. The data from two (or more) messages are combined and sent in a single communication by locating sections of the system where a merge will affect the overall execution time, and determining before the merge takes place whether it will positively or negatively affect the system.

7 Claims, 13 Drawing Sheets

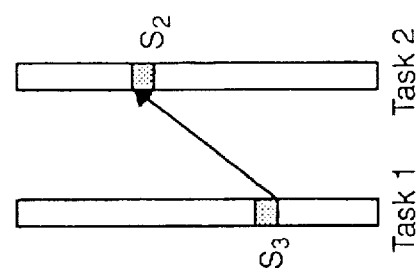
FIG. 3A
FIG. 3B
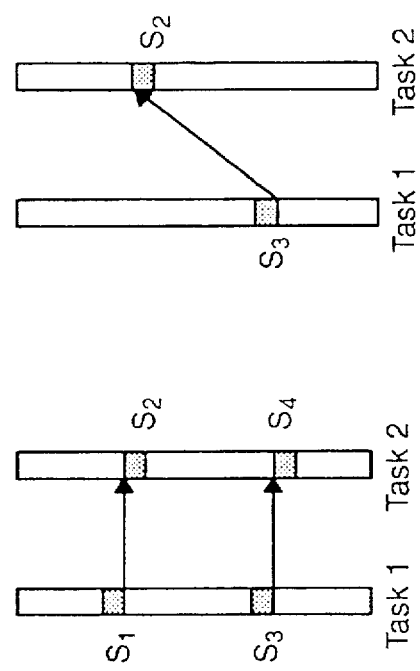
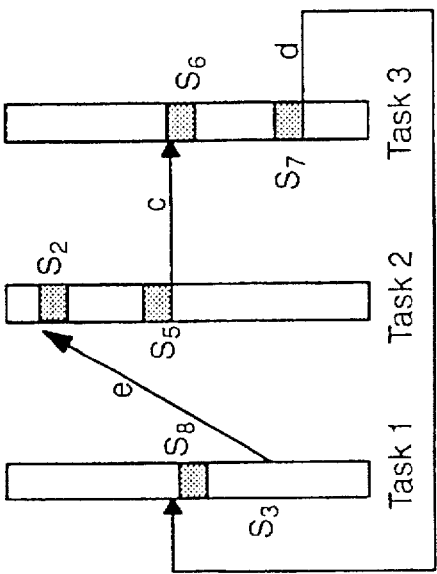
FIG. 4A
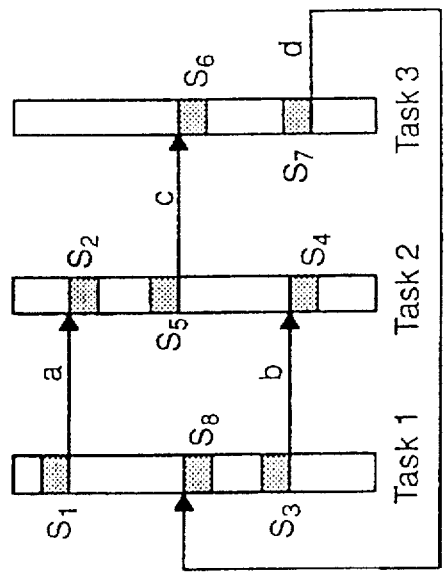
FIG. 4B

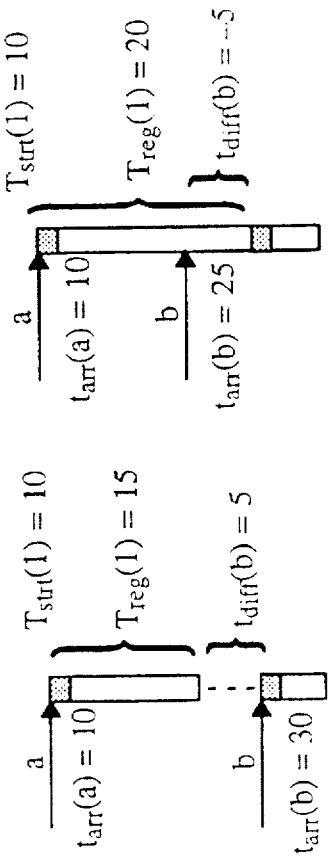
FIG. 6D
FIG. 6E
FIG. 6F
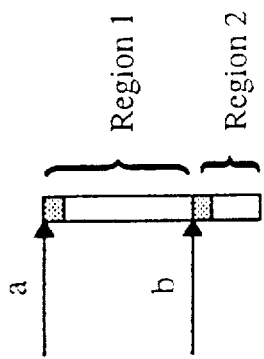
FIG. 7A
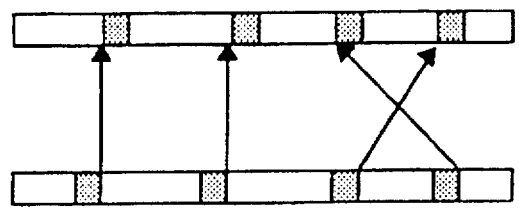
FIG. 7B

Before Merge

After Merge

Before Merge

After Merge

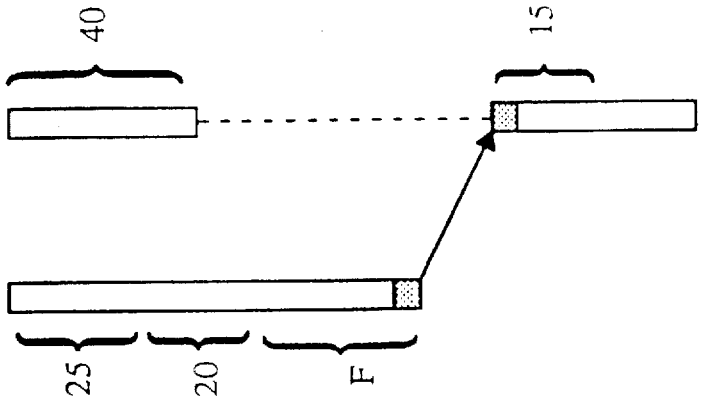
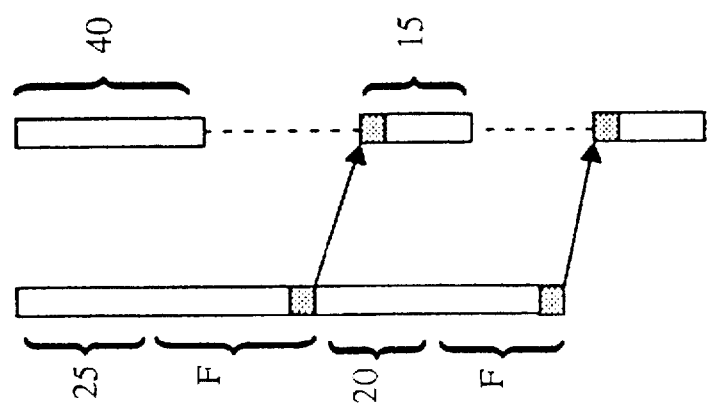
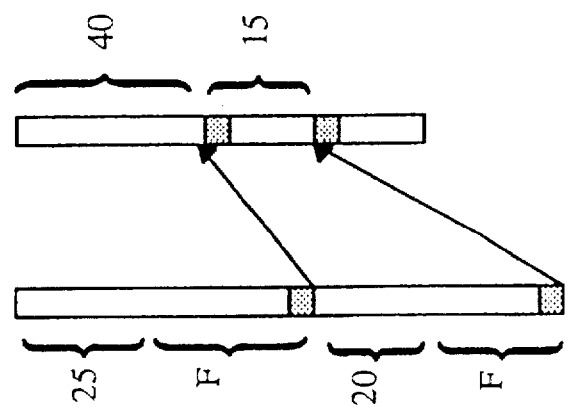

Dependence Pattern

Communication Pattern

FIG. 13

```
01  initialize all regional and dependence data
02  initialize non_mergeable_set to null
03  LOOP
04     task_x = maximum execution time task
05     task_y = origin_of_dominant_chain (task_x)
06     LOOP
07        ddc_set = set of mergeable DDC pairs in task_y
08        IF |ddc_set| > 0
09        THEN
10           choose a pair of DDCs for merging
11           recalculate regional and dependence data
12           IF merging will produce a positive effect  OR
13              the new Max Exec Time ≤ previous MET
14           THEN
15              merge the two DDCs
16              reset regional data to that just calculated
17              exit loop
18           ELSE
19              delete current ddc pair from ddc_set
20              add current ddc pair to non_mergeable_set
21           END IF
22        ELSE
23           IF task_y = task_x
24           THEN
25              exit loop
26           ELSE
27              task_y = next_task_in_chain (task_y)
28           END IF
29        END IF
30     END LOOP
31     IF a merge was not performed
32     THEN
33        exit loop
34     END IF
35  END LOOP
```

FIG. 14C
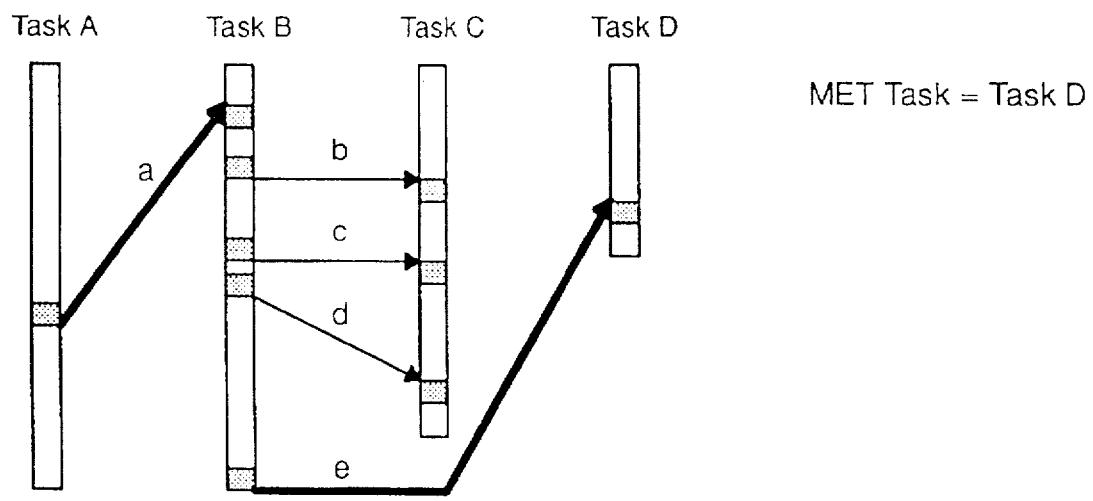
MET Task = Task D
 Move to first task in dominant chain of MET task.
FIG. 14D
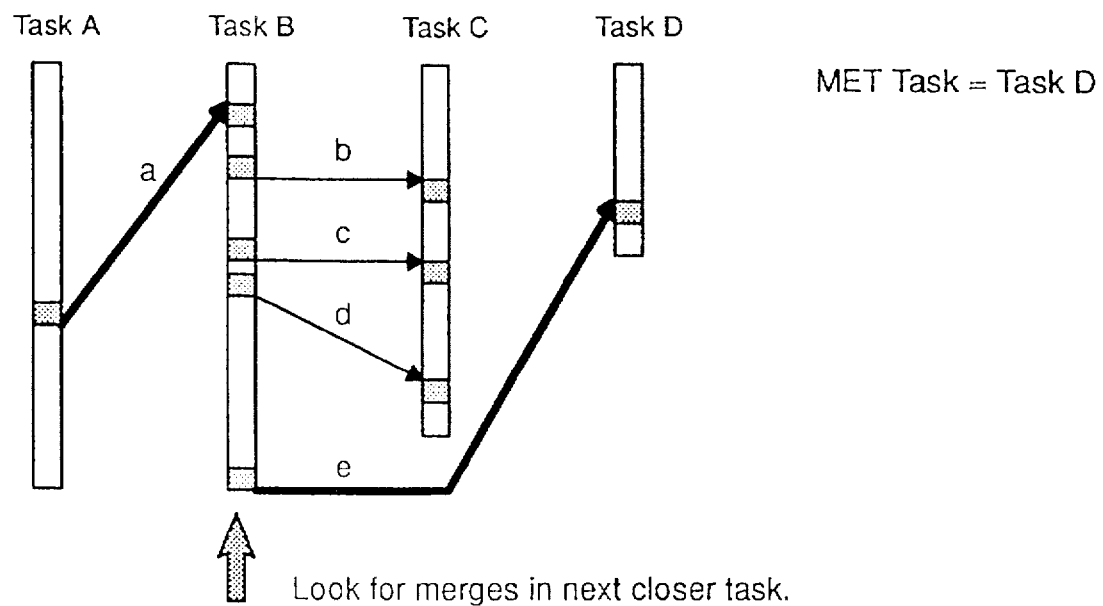
MET Task = Task D
Look for merges in next closer task.

MET Task = Task C

Start with the MET task.

PARALLEL PROGRAM EXECUTION TIME WITH MESSAGE CONSOLIDATION

BACKGROUND OF THE INVENTION

The present invention relates to distributed memory multiprocessors and more particularly to message merging (also called message combining or message consolidation) in programs used in distributed memory multiprocessor systems.

Distributed memory multiprocessors have become very pervasive in recent years. Distributed memory system topologies can have any number of processors and configurations. The reason for the popularity of distributed memory multiprocessors is due to the relative ease with which they can be scaled (as compared to shared memory multiprocessors) and the ability to build such systems easily without the need for a large number of customized parts. Unfortunately, programming distributed memory multiprocessors can be a very involved and intricate process. In particular, the programmer has to worry about data partitioning, optimizing communication, and overlapping computation and communication to reduce the overall execution time. It is therefore no surprise that a significant amount of effort has been devoted to the development of tools and environments that ease the burden of programming distributed memory multiprocessors. Most of these tools/environments begin by deriving a task graph representation of the source program. This task graph representation is generated in a form that is usable by a computer program. In the context of task graphs, a task traditionally refers to a sequence of computations that immediately follows one or more receives and which terminates with one or more sends. Nodes in this task graph correspond to computations (tasks) while arrows represent the communication among the tasks. Many systems allow the programmers to specify the task graph directly. These tools/environments then map the task graph to a processor graph which represents the physical configuration of the system in a manner that satisfies some optimization criterion. In the processor graph, nodes correspond to processors, while the edges correspond to the physical communication links among the processors. FIG. 1 is an example of a processor graph with six processing elements (PEs). Examples of such optimization criteria are a reduction in the overall amount of communication, a reduction in the overall execution time, and a reduction in the load imbalance among the processors.

Opportunity exists for minimizing inter-processor communications in programs that are manually partitioned and scheduled. In addition, many existing techniques for scheduling parallel programs onto distributed memory multiprocessors make unrealistic assumptions about the underlying processor architecture or the inter-processor communication. The clustering based scheduling techniques group tasks into clusters assuming a fully connected topology and then schedule the clusters onto the processors. Consequently, further optimizations are again possible to reduce inter-processor communication. Scheduling techniques that make unrealistic assumptions about communication (such as uniform message sizes, infinite channel bandwidth, and synchronous communication occurring in phases) can also result in schedules where inter-processor communication can be further optimized.

Message merging takes place after the program has been partitioned and scheduled onto the separate processing elements (PEs) of the system, but before the program is actually run. FIG. 2 is an example of a program scheduled onto the processor graph of FIG. 1. The arrows indicate communications (messages) between tasks. The notion of a "task" in a task graph is quite different from the way in which the term is used here as, for example in FIG. 2, when the label "Task 2" is used at the base of a vertical bar to describe the entire set of code running on a single PE. Each vertical bar represents processing time from top to bottom, although no time correlation is intended between tasks. The shaded areas indicate a "send" or "receive" statement. The arrows in FIG. 2 do not indicate that a direct physical connection exists between two PEs, but that a path exists from the source of the message (source PE) to the destination of the message (sink PE). Path is defined as a physical connection from one PE to another which may or may not include one or more intermediate PEs. That is, if a message is being sent form $PE_1$ $PE_2$ in FIG. 1, it would need to be sent to $PE_2$ (or $PE_4$) first and then sent to $PE_5$. By reducing the number of messages in the system, contention for the communication links may be reduced, possibly reducing the execution time as well. Not just any pair of messages may be merged, however. Determining in advance the effect that a merge will have on the system as a whole is essential for choosing suitable pairs of messages for merging. If this is not done, merging can greatly increase the execution time of a program including creating a deadlock.

One way that has been used to accomplish message merging is to combine messages that are in the I/O processor of each processing element (PE) when they have the same destination. This is a dynamic technique in that it occurs during runtime. Only messages that are waiting in the I/O processor's queue to be sent can possibly be merged. Illustrative of this approach are U.S. Pat. Nos. 4,984,235, 5,046,000, and 5,117,420.

Another approach has been used when the system has an interconnection network between the PEs, instead of direct links between connected PEs. In this type of system, each node in the network can then perform dynamic merging when messages concurrently present in a given node have the same destination. Illustrative of this approach are U.S. Pat. Nos. 4,920,484, 5,006,978, and 5,276,899.

Still another approach for combining two mergeable data dependencies is set forth in Wang, K. Y., and Mehrotra, P., "Optimizing Data Synchronizations on Distributed Memory Architectures", Proceedings of the 1991 International Conference on Parallel Processing, Vol. II, pp. 76-82. This approach uses only localized information to choose pairs of messages for merging. No advance knowledge of how a merge will affect the entire system is present. Even though a merge looks good locally, it may greatly increase the execution time of the system overall. In addition, with only a local view of its effects, a merge may actually introduce a deadlock into the system.

It is an object of the present invention to reduce the execution time of a parallel program running in a distributed memory multiprocessor by merging pairs of messages.

It is another object of the present invention to reduce the number of messages in the distributed memory multiprocessor system thereby reducing the contention for communications links and program execution time.

It is still another object of the present invention to evaluate the effect a prospective merge will have on the system to reduce the overall execution time of a program.

SUMMARY OF THE INVENTION

In one aspect of the present invention a method of determining which messages in a program for a distributed memory parallel processor system can be merged without causing deadlock of the system when the program is run is provided. Regions in the code allocated to each processor are determined, where new regions begin at the receive statements of entering messages. Two consecutive outgoing messages to a second processor and sent from a first processor are identified, where outgoing messages will be consecutive when considering only messages going to the second processor. The two consecutive messages are checked to see if they are crossed, with crossed messages having a first receive statement whose message is sent first from the first processor, the first receiving statement being located after the receive statement which is to receive the outgoing message from the second consecutive outgoing message. For non-crossed messages it is determined whether there is a chain that originates between the two receive statements and terminates between the two send statements for the consecutive messages being considered for merging and not merging the messages if such a path is found, thereby avoiding deadlock.

In another aspect of the present invention a method carried out on a computer of merging two or more messages of a program for a distributed memory parallel processor system, so that the messages can be sent as one message to reduce the overall computation time and bus loading of the system while running the program is provided. The program is partitioned into tasks, the length of time it will take to execute each task is estimated, and the tasks scheduled to run on respective parallel processors. Regions in the program code allocated to each processor are determined, where new regions begin at the receive statements of entering messages. The start time of each region is estimated based on whether it takes longer for the execution of the previous region to be completed than for the message to arrive which defines the beginning of the region, or if it takes longer for the message to arrive which defines the beginning of the region than the time the previous region takes to complete its execution. Two consecutive outgoing messages to the same processor are identified, where outgoing messages will be consecutive when considering only messages going to the same processor. The effects of merging the identified pair of consecutive outgoing messages is determined based on the overhead needed to send the merged message, change in arrival time seen at the location where the first message is to be received, and removal of send and receive messages which will be eliminated by combining the messages.

BRIEF DESCRIPTION OF THE DRAWING

FIGS. 3A and 3B show task graphs for a system with only two PEs and two dependencies both before and after a merge, respectively.

FIGS. 4A and 4B show task graphs before and after a merge takes place, respectively, with the merge resulting in a deadlock situation.

FIGS. 6A, 6B, 6C, 6D, 6E and 6F show task graphs which illustrate two examples useful in explaining the determination of the time difference between when a message arrives at its destination PE and when the PE execution arrives at the receive statement for the message, for each of two different situations. FIGS. 6A-C show a task that does not start with an entering dependence and FIGS. 6D-F showing a task that does start with an entering dependence.

FIGS. 7A and 7B are task graphs with FIG. 7A showing crossed dependencies and non-crossed dependencies. FIG. 7B shows the sections of a task formed by two entering dependencies that are being considered for merging.

FIGS. 10A, 10B and 10C are task graphs illustrating a Case 2b merge from Table 2.

FIG. 13 is a pseudocode listing for implementing the message consolidation process in accordance with the present invention.

FIGS. 14A, 14B, 14C, 14D, 14E and 14F are task graphs showing a system with regional and dependence related data before, during, and after merging takes place in accordance with the present invention.

DETAILED DESCRIPTION OF THE INVENTION

Figure 1:
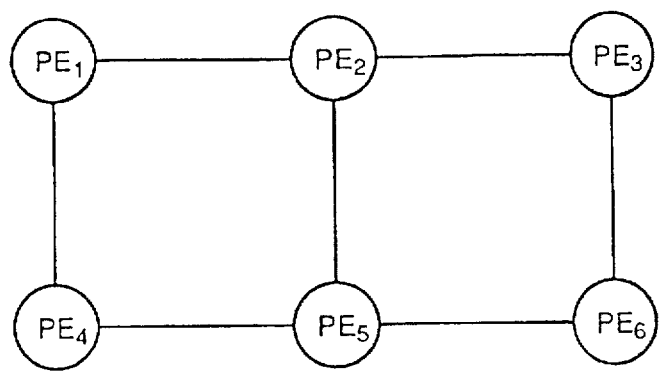
FIG. 1 shows a graphic representation of a distributed memory system topology with six processing elements.

Merging takes two messages, combines both sets of data, and sends all the data in one message. It is necessary that both messages originate in the same PE and terminate in the same PE. Referring now to the drawing and particularly FIG. 3 thereof, a system with only two PEs and two dependencies both before and after a merge is shown. A problem arises, when only those two tasks are used to determine if the merge should take place. In the situation shown in FIGS. 3A and B, the effect that the merge will have on the system is not known in advance. In FIG. 3A, Task 1 represents the code running on one processor, with Task 2 representing the code running on another processor. FIGS. 4A and B show an example of the problem that can arise when the effects that a merge will have on the system is not determined in advance. In FIG. 4A, dependencies a and b are being considered for merging. If only task 1 and task 2 are examined to make this decision, it appears that the merge is acceptable. If the merge takes place, however, a deadlock is introduced into the system as shown in FIG. 4B. The deadlock is due to the fact that a circular dependency has been created. That is, statement S8 appears in Task 1 before statement S3. Before S8 can be executed, though, S7 must have already sent message d to S8. Continuing backwards along the messages in this manner, it turns out that statement S3 must be executed before statement S8 for S8 to be able to receive its message. This is not possible, however, since S8 executes in Task 1 before S3. Thus, execution in Task 1 can never get past S8 and the system is said to be in a deadlocked state, since it will never finish execution. The present invention adds important capabilities to this localized merging technique that prevent the introduction of a deadlock due to a merge being carried out. Deadlock prevention is accomplished by examining the entire system (instead of just the two tasks directly involved in the merge) to see if there is a chain in the graph that originates between the two receive statements for the messages being considered for merging, and terminates between their two send statements. If this situation is present, as it is in FIG. 4A, no merge will be performed. This prevents deadlock creation.

The present invention determines the effect that any given merge will have on the system. It does this by first determining the effect a potential merge will have on the source and sink tasks. However, since the only change in the source task is the removal of one send statement, the execution time of the source task will always decrease or not change at all depending on the types of regions below the removed send. Thus, it is the effect of a merge on the sink task that might possibly increase the execution time of the system as a whole. If it is determined that the start time of all regions in the sink task will decrease or stay the same, the merge can be performed without further checking. If the execution time of any region in the sink task increases, however, the effect that this increase has on the rest of the system must be determined before any possible merge takes place. This is accomplished by implementing the merge in a copy of the simulated multiprocessor hardware system structure and program information, and calculating the execution time. Scheduling for parallel processors means allocating each task in the task graph to a processing element (PE) in the target machine and allocating messages between PEs to the communication channels in the machine. Scheduling and subsequent merge evaluation can be performed on a uniprocessor computer. When the message consolidation has been completed, the optimized program can be loaded on multiprocessor system and executed.

New definitions needed to explain the present invention are defined in more detail below.

Chains of Dependencies—This is an ordered list of dependencies that meets certain conditions. A dependence $\delta_a$ is said to "reach" dependence $\delta_b$ directly, indicated by $\delta_a => \delta_b$, if the sink task of $\delta_a$ is the source task of $\delta_b$, and if the receive statement of $\delta_a$ is prior to the send statement of $\delta_b$ in that task. A sink task is a task containing the receive statement. A source task is a task containing the send statement. A chain of dependencies is an ordered list of dependencies such that for every adjacent pair in the list, ($\delta_x$, $\delta_y$), $\delta_x => \delta_y$.

Thus a chain could be expressed as $\delta_x => \delta_y = x \ldots => \delta_z$, or as $\delta_x =>^+ \delta_z$.

Also, a chain could consist of only one dependence, as in $\delta_x =>^* \delta_z$ where x=z.

In FIG. 4A, dependence a followed by dependence c is a chain, since a=>c, dependence c followed by dependence d is a chain, since c=>d, dependence d followed by dependence b is a chain, since d=>b, and therefore a=>⁺b. Dependence a is also a chain, since a chain can consist of only one dependence. However, b followed by c, is not a chain since execution in task 2 cannot go from statement S4 up to statement S5.

Figure 2:
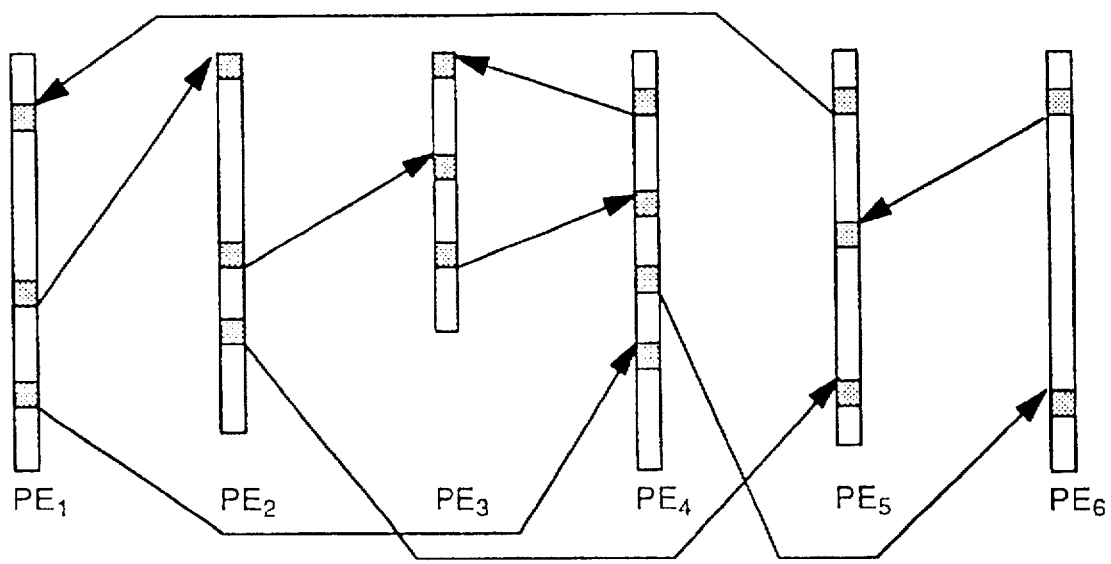
FIG. 2 shows a task graph for the distributed system of FIG. 1 with an example program scheduled on the graph.

Data Dependence Cluster—This definition is found in Wang, K. Y., and Mehrotra, P., "Optimizing Data Synchronizations on Distributed Memory Architectures", Proceedings of the 1991 International Conference on Parallel Processing, Vol. II, pp. 76–82, and is presented here to clarify what follows. A data dependence cluster (DDC) is a set of multiple data dependencies, all with the same source task and sink task, implemented with a single data transmission. The data from all of the dependencies is combined and sent as a unit. A data dependence cluster is thus a 4-tuple, $\Psi=(\Omega, \Delta, S_1, S_2)$, where $\Omega$ is a set of data dependencies from $T_1$ to $T_2$, $\Delta$ is the union of all the data of the dependencies in $\Omega$, $S_1$ is the last statement in $T_1$ that produces any data in $\Delta$, and $S_2$ is the first statement in $T_2$ that needs any of the data in $\Delta$. The lone communication in FIG. 2B is actually a data dependence cluster formed from the two messages in FIG. 2A.

Mergeable Data Dependence Clusters—This is a definition that will prevent two messages from being merged if the merge will create a deadlock in the system. Two data dependence clusters $\Psi^a=(\Omega^a, \Delta^a, S^a_1, S^a_2)$ and $\Psi^b=(\Omega^b, \Delta^b, S^b_1, S^b_2)$ are called mergeable if there is no dependence chain, $\delta_x =>^* \delta_y$, starting with dependence $\delta_x$ and ending with dependence $\delta_y$, such that the source statement of $\delta_x$ is between $S^a_2$ and $S^b_2$ in $T_2$ and the sink statement of $\delta_y$ is between statements $S^a_1$ and $S^b_1$ in $T_1$. In FIG. 4A, data dependence clusters a and b are being considered for merging. This definition says that if there is a dependence chain starting between statements $S_2$ and $S_4$ in task 2 and ending up between statements $S_1$ and $S_3$ in task 1, then that merge will produce a deadlock and the two data dependence clusters are not mergeable. Dependence c and d form such a chain, so dependence a and b are not mergeable.

Figure 5A:
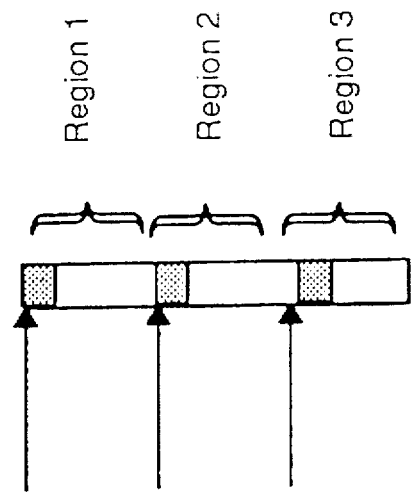
FIGS. 5A and 5B show task graphs and how regions in a task are numbered based on the location of incoming dependencies.
Figure 5B:
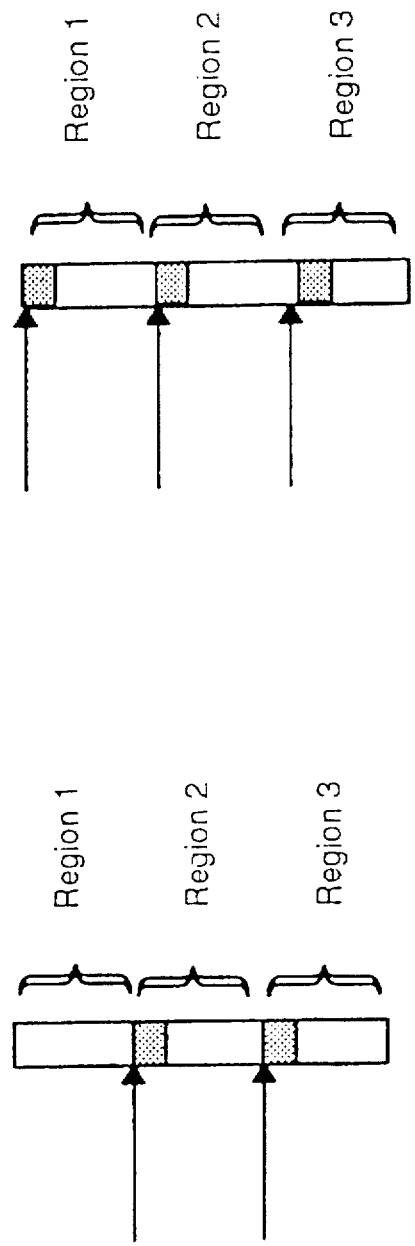

Regions of a Task—These partition a task (code which executes in one PE) into sections that have different properties. Dependencies entering the task define the regions in that task. The number of regions in a task is defined as one more than the number of entering dependencies. If the task starts with an incoming dependence, however, then the number of regions equals the number of entering dependencies. Note that the regions are numbered starting with the topmost region as region 1, and increasing from there down to the end of the task. FIG. 5 shows examples of both of these possibilities.

There are two basic types of regions in a task. The type of a given region depends on which takes longer to arrive at the start of the region—execution through the task from above, or execution through the entering dependence. If task execution arrives at a receive statement before the message with the data for the dependence, the task waits for the message. The region defined by this dependence is called a D-region, or dependence region, because the execution time through the dependence determines when execution enters the region. If task execution takes longer to arrive at the receive statement, the region below that statement is a T-region, or task region. The first region in every task is a D-region by definition.

Regional and Dependence Data—These are values that are used to determine where to look throughout the system for potential merges, and which pairs of messages should be merged.

$T_{str}(x)$ is the start time of region x $T_{reg}(x)$ is the execution time of region x $t_{arr}(y)$ is the arrival time of the message for dependence y at its destination PE $t_{dif}(y)$ is the difference between $t_{arr}(y)$ and when PE execution time arrives at the receive statement for y Two data values are associated with every region. $T_{str}(x)$, or the start time for region x, indicates the maximum time it takes for control to arrive at the first statement in the region. $T_{reg}(x)$, or the regional time for region x, indicates the time it takes for execution to go from the beginning of the region to the end of the last statement in the region. Note that $T_{reg}$ is an estimate, and does not need to be calculated.

Associated with every dependence y is a value, $t_{arr}(y)$, that indicates the time it takes for the data (i.e. the message) to arrive at the sink task. Also associated with every dependence is the time differential, or $t_{dif}(y)$. This value indicates the relationship between the data arrival time ($t_{arr}$) and the time that control reaches the receive statement in the task. The $t_{dif}$ value will be negative if the task execution time is greater than the $t_{arr}$ value for the entering dependence, i.e. when the region defined by this dependence is a T-region. If the region is a D-region, the $t_{dif}$ value for that dependence will be positive.

The equations for these values are as follows:

$T_{str}(1)=0$ if the task does NOT begin with an entering dependence $T_{Str}(1)=t_{arr}(Y)$ otherwise.

$T_{str}(x)=\max [T_{str}(x-1)+T_{reg}(x-1), t_{arr}(y)]$ for $x>1$ $t_{arr}(y)=T_{str}(z)+T_j(S_k)+\text{trans}(M)$ where: $S_k$ is the send that is the source statement of dependence y, z is the region in which the source of dependence y resides.

$T_j(S_k)$ is defined as the time it takes to get to the end of statement k from the beginning of the region it is in (which is z in this case).

trans(M) is the total communication time ($T_{comm}$) for data of size M minus the flat overhead (F) (F is already included in $T_j(S_k)$).

$t_{dif}(y)=t_{arr}(y)$ if dependence y defines the first region in the task.

$t_{dif}(y)=t_{arr}(y)-(T_{str}(x-1)+T_{reg}(x-1))$ if dependence y defines region x which isn't the first region in the task.

Figure 6A:
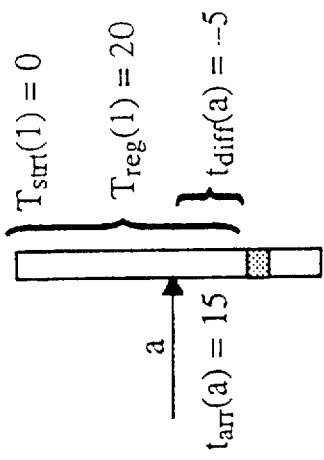
Figure 6B:
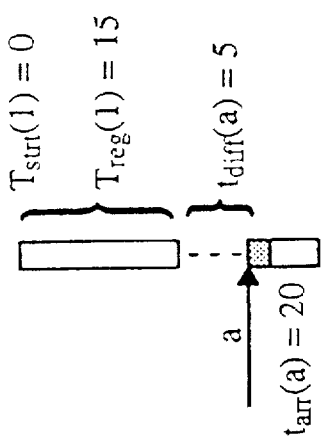
Figure 6C:
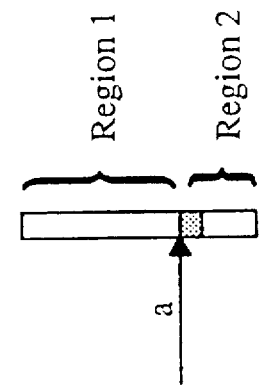

FIGS. 6A–F shows two examples of the calculation of $t_{dif}$ values for each of two different situations. FIGS. 6A–C show the calculation of a $t_{dif}$ value for a task that does not start with an entering dependence. FIG. 6A shows the initial setup, with a sink task, one entering dependence, two regions and $t_{dif}(a)=t_{arr}(a)-(T_{str}(1)+T_{reg}(1))$.

FIG. 6B shows the calculation when the $t_{dif}$ value for dependence a is positive, and the message arrival time is greater than task execution time from above. FIG. 6C shows the calculation when $t_{dif}(a)$ is negative and the message arrival time is less than task execution time from above. FIGS. 6D–F show example calculations for a task that does start with an entering dependence. FIG. 6D is a sink task with two entering dependencies, two regions, and $t_{dif}(b)=t_{arr}(b)-(T_{str}(1)+T_{reg}(1))$.

In FIG. 6E the message arrival time is greater than task execution time form above $t_{dif}(a)$ is equal to 10 and $t_{dif}(b)$ is positive. In FIG. 6F message arrival time is less than task execution time form above, $t_{dif}(a)$ is equal to 10 and $t_{dif}(b)$ is negative.

The Effects of Merging

FIGS. 7A and B illustrate the concepts dealing with the effects of merging. These are crossed dependencies and non-crossed dependencies shown in FIG. 7A, and the sections of a task formed by two entering dependencies that are being considered for merging, shown in FIG. 7B.

Figure 8A:
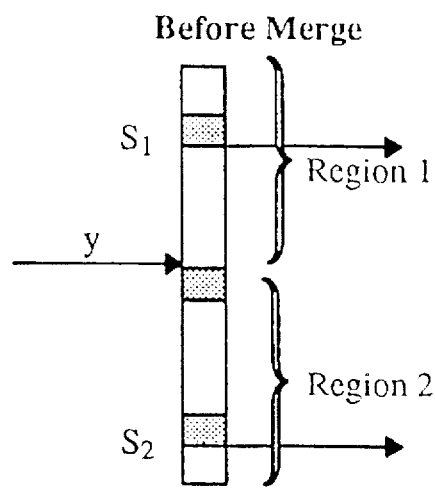
FIGS. 8A and 8B are task graphs that show the effects on a source task before and after a merge.
Figure 8B:
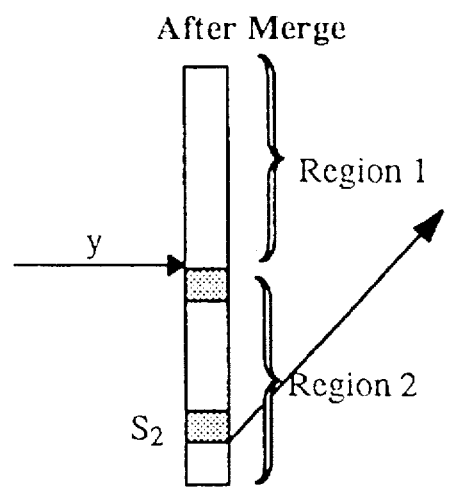

Source Task Effects—A merge of two data communications causes the removal of one send statement from the source task. This will reduce the $T_{reg}$ value of the region where the statement originally resided. The reduction in execution time propagates down the task until the first D-region is encountered. This region effectively terminates the effects of the merge in this task, preventing its total execution time from being reduced. If no D-region lies between the removed send and the end of the task, the execution time of the task as a whole will be reduced. Note that this may cause some region to change from a T-region to a D-region. FIGS. 8A and B shows these effects on the source task before and after merge, respectively. Assuming that the flat overhead F is 5, the following values show the effects of a merge on a source task, that is, the task containing the send statements.

Before the merge occurs, assume $T_{reg}(1)=30$, $T_{str}(1)=0$, $t_{arr}(y)=28$ with Region 2 a T-Region. Assuming $T_{reg}(2)=40$, the Total Execution Time(TET)=70. After the merge $T_{reg}(1)=25$, $T_{str}(1)=0$ and $t_{arr}(y)=28$. Region 2 is now a D-region and TET=68. If all these values stay the same except for $t_{arr}(y)$, which changes to 35, Region 2 starts out a D-region before the merge and remains a D-region afterwards. The total execution time in both cases is 75. Note that F stands for the flat overhead associated with every send statement. This is the time it takes to get ready to send the message, and includes any system calls, copying data into I/O buffers, etc.

Figure 9A:
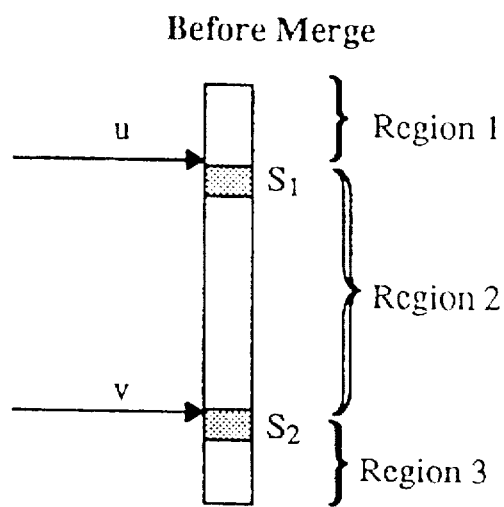
FIGS. 9A and 9B are task graphs which show the effects on a sink task before and after a merge.
Figure 9B:
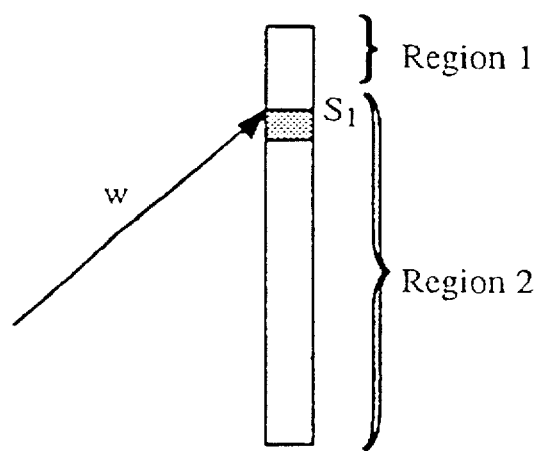

Sink Task Effects—The merge also affects the sink task, but the changes in execution time produced are slightly more complex. One of the major things that happens is that one region goes away. One less communication is entering the task, so there will be one less region. The other effects vary depending on whether or not the dependencies cross. FIG. 9 includes a diagram that shows these effects on the sink task. Before the merge, assuming F=5, the following values indicate the effects of a merge on a sink task, $T_{reg}(1)=15$, $T_{str}(1)=0$, $t_{arr}(u)=10$. In Region 2 which is a T-region $T_{reg}(2)=25$, $T_{str}(2)=25$, and $t_{arr}(v)=32$. In Region 3 which is a T-region $T_{reg}(3)=20$ and $T_{str}(3)=40$. The Total Execution Time (TET)=60 before the merge. After the merge $T_{reg}(1)=15$, $T_{str}(1)=0$ and $t_{arr}(w)=29$. In Region 2 which is a D-region $T_{reg}(2)=45$ and $T_{str}(2)=29$. The TET=74.

Non-crossed Dependencies

Two dependencies that are not crossed define three sections of their sink task that see differing effects from a merge as seen in FIG. 7B as discussed above. Sections are not the same as regions. Any of the three sections shown could contain multiple regions. Notice that section 1 will not be directly affected by the merge at all. The effects on sections 2 and 3 vary, depending on the values associated with each dependence. What needs to be calculated is the change in message arrival time ($\Delta t_{arr}$) seen at the receive statement for dependence a after the merge takes place. This will determine whether section 2 in the sink task will execute sooner, later, or at the same time as before.

This change in $t_{arr}$ value occurs at the sink statement of dependence a. Before the merge, the $t_{arr}$ value of dependence a determines any delay present for section 2's code. Since the lone communication after the merge points to the same place, the change in $t_{arr}$ value ($\Delta t_{arr}(a,b)$) indicates the change in start time seen for section 2. Thus, if $\delta_a$ and $\delta_b$ were being considered for merging, the increase in $t_{arr}$ value for the merge would be:

given: $t_{arr}(a)=T_{str}(x)+T_j(S_j)+\text{trans}(M)$ (M is the size of the data sent in message a)

$t_{arr}(b)=T_{str}(y)+T_j(S_k)+\text{trans}(N)$ (N is the size of the data sent in message b)

$S_j$ is in region x $S_k$ is in region y $S_j$ is lexically prior to $S_k$ in the source task $\Delta t_{arr}(a,b)=t_{arr}(b)-t_{arr}(a)+\text{trans}(M)-F$ The effects of a merge of two non-crossed dependencies on the start time of sections 2 and 3 are summarized in Tables 1 and 2. Figs. 10A, B, and C show an example of Case 2b from Table 2 in which the start time for section 2 increases and yet the start time of section 3 decreases. FIG. 10A shows the dependence pattern where F=30, trans(M) for a is 10 and trans(N) for b is 5. FIG. 10B shows the communication pattern before merge with $T_{srt}$ for region 2 equals 65 and $T_{srt}$ for region 3 equals 110. FIG. 10C shows the communication pattern after the merge with $T_{srt}$ for region 2 equals 90 and $T_{srt}$ for region 3 equals 105.

TABLE 1

MERGE EFFECTS OF NON-CROSSED DDCS SEEN IN SECTION 2 OF THE SINK TASK 2.

|  | Change in Section 2 | Causal Condition |
| --- | --- | --- |
| Case 1 | No change | $\Delta t_{arr}$ (a,b) $\leq -t_{diff}$ (a) |
| Case 2 | Increase | $\Delta t_{arr}$ (a,b) $> -t_{diff}$ (a) |
| Case 3 | Decrease | not possible |

TABLE 2

MERGE EFFECTS OF NON-CROSSED DDCs SEEN IN SECTION 3 OF THE SINK TASK GIVEN A SPECIFIC CHANGE IN SECTION 2

|  | Change in Section 2 | Change in Section 3 | Causal Condition |
| --- | --- | --- | --- |
| Case 1a | No change | No change | $t_{diff}$ (b) $\leq 0$ |
| Case 1b | No change | Decrease | $t_{diff}$ (b) $> 0$ |
| Case 1c | No change | Increase | not possible |
| Case 2a | Increase | No change | $\Delta t_{arr}$ (a,b) $+ \tau = t_{diff}$ (b) |
| Case 2b | Increase | Decrease | $\Delta t_{arr}$ (a,b) $+ \tau < t_{diff}$ (b) |
| Case 2c | Increase | Increase | $\Delta t_{arr}$ (a,b) $+ \tau > t_{diff}$ (b) where $\tau = \min[0, t_{diff}$ (a)] |

Crossed Dependencies

Figure 11A:
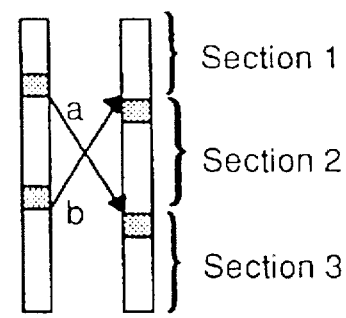
FIGS. 11A and 11B are task graphs showing the effects of crossed data dependence clusters.
Figure 11B:
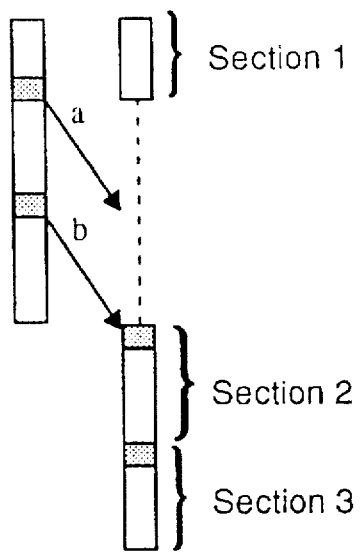

Dependencies that cross have different dependencies on what affects the start times of each section. This occurs because the dependence pattern is different from the communication pattern as shown in FIGS. 11A and B. In the communication pattern (what actually occurs at runtime), sections 2 and 3 will always execute "back-to-back". Because of this, they will always see the same effect of a merge; that is, their start times will both increase, both decrease, or both stay the same. Table 3 illustrates the effects a merge has on sections 2 and 3 for crossed dependencies. FIG. 9 includes a diagram that shows these effects on the sink task.

TABLE 3

MERGE EFFECTS OF CROSSED DDCs

|  | Change in Sections 2 and 3 | Causal Condition |
| --- | --- | --- |
| Case 4 | No change | trans(M) = F or (trans(M) $<$ F and $t_{diff}$ (b) $\leq 0$) or (trans(M) $>$ F and trans(M) $-$ F $\leq -t_{diff}$ (b)) |
| Case 5 | Decrease | trans(M) $<$ F and $t_{diff}$ (b) $> 0$ |
| Case 6 | Increase | (trans(M) $>$ F and trans(M) $-$ F $> -t_{diff}$ (b)) |

Merging to Reduce Execution Time

When using merging to try and reduce the execution time of an entire system, the main focus should be the task that has the maximum execution time of any task in the system. Reducing the execution time of this task is the only way to reduce the time overall. However, any pair of dependencies being considered for merging must be in certain locations of the task graph for the effect to be felt by the maximum execution time (MET) task. These locations include certain sections of the MET task itself, and certain sections of tasks back along the dominant chain leading to the MET task.

Figure 12:
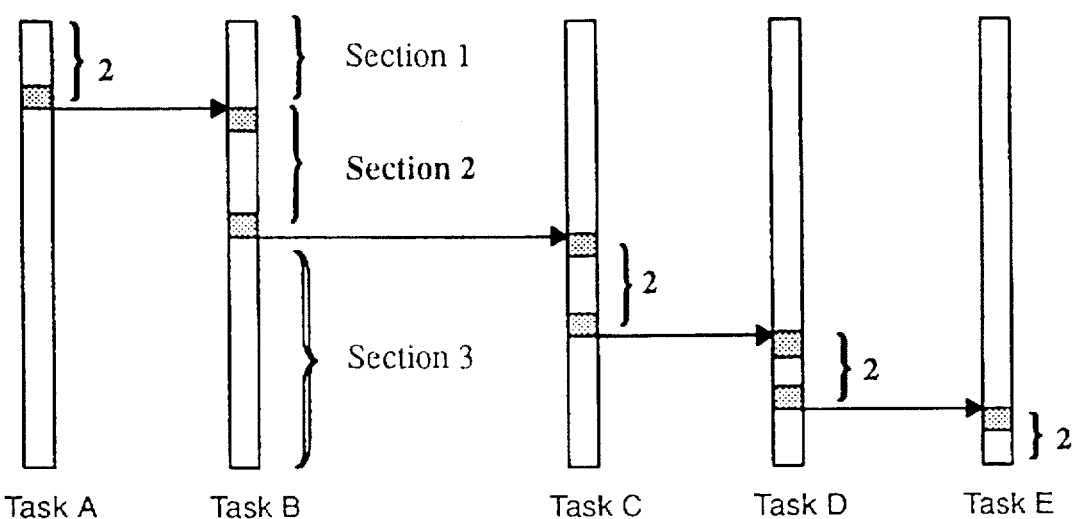
FIG. 12 is a task graph showing a graphic definition of a dominant chain.

Dominant Chain of Dependencies: This is a unique chain in any given system along which merges will affect the execution time of the final destination PE of the chain, which by definition is the PE that has the maximum execution time in the system. For a profitable merge to take place along a chain, each dependence in the chain must define a D-region, and in each task there must not exist any other D-region between the one in the chain and the region in which the source statement of the next dependence in the chain resides. This relationship creates a dominant chain as shown in FIG. 12, and is necessary to ensure that the benefits of any merge along the chain ripple down to the task whose execution time is to be reduced. In FIG. 12 all DDCs shown define D-regions in the tasks they enter. Other DDCs and tasks exist in this system, but only the dominant chain of the maximum execution time (MET) is shown. All DDCs entering section 2 of any of the tasks define T-regions (by definition of dominant chain). A merge of DDCs from any one of these tasks to any other task in the system will reduce the execution time of the MET task as long as the send statement of the first DDC in the pair is found in section 2 of the sink task.

To reduce the execution time of the program overall, merge pairs of dependencies whose first send statement is found in the section indicated by a "2" in any task along the dominant chain leading to the MET task. Within a given section in a given task, choose pairs of dependencies for merging as follows.

Go back as far as possible along the dominant chain, and search the tasks in order toward the MET task. That is, for the dominant chain shown in FIG. 12, start looking for merges in Task A, then Task B, Task C, and so on. This helps ensure that the positive effects of a merge on the source task are spread to as many other tasks as possible.

In each task, choose the first pair in section 2 that would produce a decrease (or no change) in the start times of the sections in the task as seen in Tables 1 through 3. This helps insure that the positive effects are seen by as much of the task as possible.

If all pairs of dependencies produce increases in the start times of sections 2 and 3 in the sink task, choose pairs that don't increase the execution time of any task in the system such that it is now greater than the time of the original MET task.

A method of merging two or more messages so that the messages can be sent as one message to reduce the overall computation time and bus loading of the system while running a program in a distributed memory parallel processor system is summarized below. Before beginning the merging process the program is partitioned into tasks (where a task is an indivisible unit of computation with no messages entering or leaving except for the beginning and end of the task), and estimate the length of time it will take to execute each task. The tasks are also scheduled to run on respective processing elements (PE) in the parallel processor. The merging process can now begin. Regions in the code allocated to each PE are determined, where new regions begin at the receive statements of entering messages. The start time of each region is estimated based on whether it takes longer for the execution of the previous region to be completed than for the message to arrive which defines the beginning of the region, or if it takes longer for the message to arrive which defines the beginning of the region than the time the previous region takes to complete its execution. The dominant chain of dependencies that leads to the processor that has the maximum execution time of the entire system is determined. Two consecutive outgoing messages to the same processor (that is, they will be consecutive when considering only messages going to that processor) are located. The effects of merging the two consecutive outgoing messages based on the resulting length of the merged message to be sent, overhead needed to send the merged message, change in arrival time seen at the location where the first message is to be received, and removal of send and receive messages which will be eliminated by combining the messages are determined. The effects of merging are determined for unevaluated consecutive outgoing messages to the same processor for each processor along the dominant chain until a beneficial merge is found. When a beneficial merge is found and performed, the regional areas are redetermined and the start and stop times of all regions are recalculated. The dominant chain of dependencies that leads to the processor that has the maximum execution time of the entire system (which may have changed) is again determined. The process of searching for possible merges, evaluating them, merging an appropriate pair of messages, and recalculating the system state is repeated until no more merges are found.

FIG. 13 shows a pseudocode listing for one implementation of the message consolidation process. In line 01, all the regional ($T_{strt}$ and $T_{reg}$) and dependence related ($t_{arr}$, $t_{diff}$ and $T_r$) values are calculated for the initial system state. Line 02 initializes the set of all non-mergeable DDC pairs to null. That is, no pairs of DDCs are exempt from examination at the start. The loop that starts at line 03 and ends at line 35 continues looping until an iteration is reached that does not produce a merge. At that point, no other merge is possible, so the IF-THEN statement of lines 31 through 34 causes an exit from the loop. For every merge that does take place, another iteration of the loop occurs with new task_x and task_y values being calculated by lines 04 and 05 if the maximum execution time task has changed.

The inner loop, from lines 06 through 30, starts with the first task (task_y) in the dominant chain leading to the MET task (task_x). If no merges are found in this task, the next task closer to task_x is examined. This is repeated until either a merge is found or until task_x itself has been searched for merges. In both of these cases, the loop is exited. Line 07 initializes the set of mergeable DDC pairs in the current task. As long a there is at least one possible merge (line 08), then a pair is chosen (line 10) for examination. The regional and dependence data are recalculated (line 11) to see if the merge will increase the execution time. If the merge cannot increase the execution time (line 12) or as long as the maximum execution time is less than it was previously (line 13), then the DDCs are merged (line 15), the regional and dependence data are adjusted to their new values (line 16), and the inner loop is exited. If the DDC pair will increase the execution time of the program, it is removed from the set of possible merges for this task (line 19) and put in the set of non-mergeable DDC pairs (line 20).

The ELSE statement of line 22 covers the case when there are no more mergeable DDC pairs in the current task. If the current task is also the last task in the dominant chain (line 23), the inner loop is exited (line 25). If not, the current task is set to the next task closer to the final task in the dominant chain (line 27).

Example of Operation

Figure 14A:
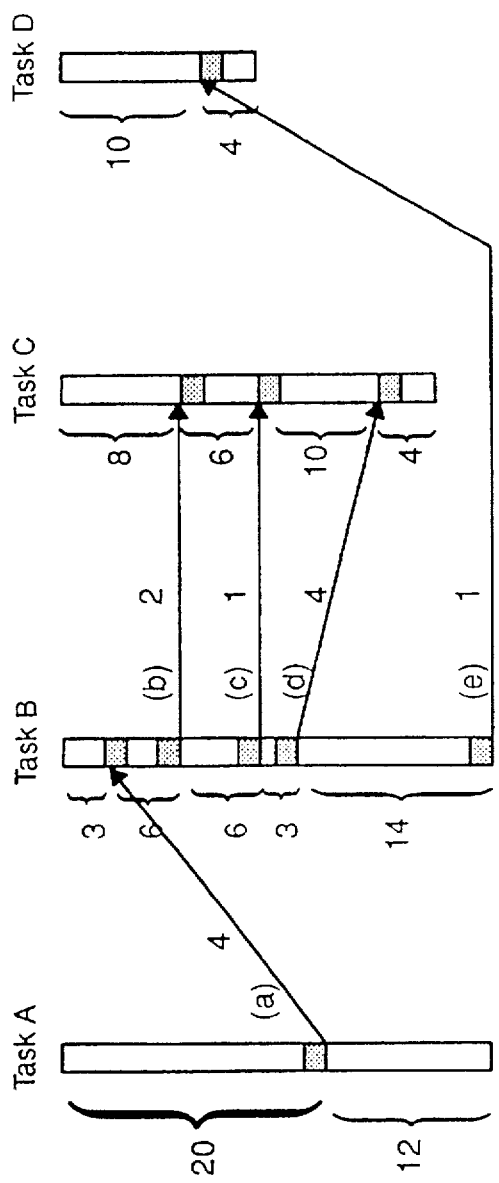
Figure 14B:
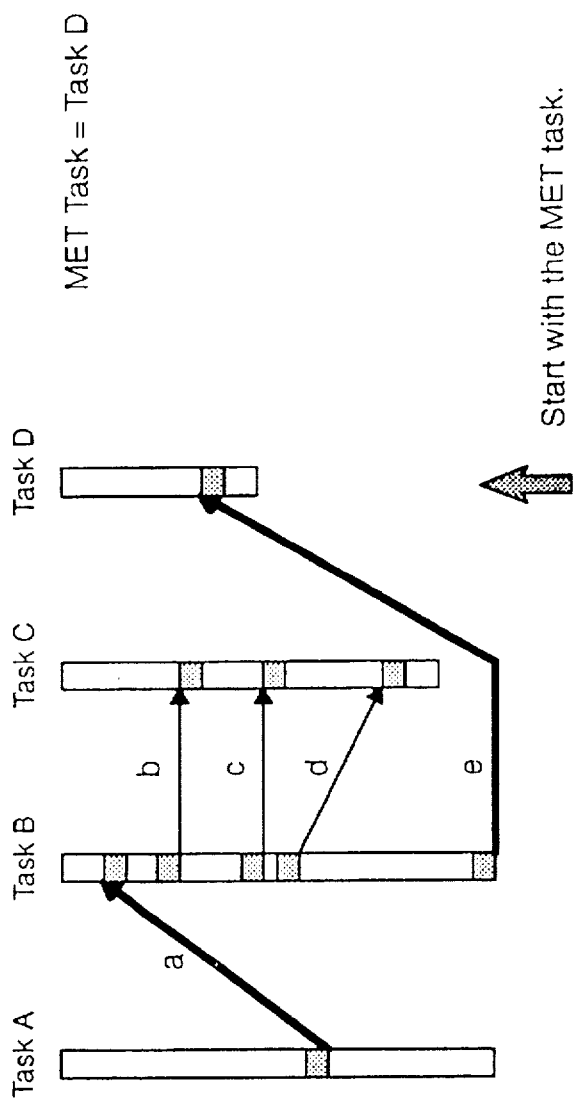

An example of the operation of this process is seen in FIGS. 14A-F. FIG. 14A shown a task graph of a system before any merging takes place. The values for all regional and dependence related data before any merge takes place is shown in Table 4 below. All messages are considered to be Data Dependence Clusters (DDCs) since a DDC could consist of one or more messages. The $t_r$ data item for each DDC indicates the transmission time of the message. The flat overhead for each send statement is assumed to be 2. Note that the $T_{reg}$, $T_r$, and $t_r$ data values are made up values for this example. All other values ($T_{strt}$, $t_{arr}$, and $t_{diff}$) are calculated from the equations previously given.

TABLE 4

| Task A | Task B | Task C | Task D |
|---|---|---|---|
| Region 1 | Region 1 | Region 1 | Region 1 |
| $T_{strt} = 0$ | $T_{strt} = 0$ | $T_{strt} = 0$ | $T_{strt} = 0$ |
| $T_{reg} = 32$ | $T_{reg} = 3$ | $T_{reg} = 8$ | $T_{reg} = 10$ |
| DDC a | | | |
| $t_{arr} = 24$ | | | |
| $t_{diff} = 1$ | | | |
| $T_r = 20$ | | | |
| $t_r = 4$ | | | |
| | Region 2 | Region 2 | Region 2 |
| | $T_{strt} = 24$ | $T_{strt} = 32$ | $T_{strt} = 54$ |
| | $T_{reg} = 29$ | $T_{reg} = 6$ | $T_{reg} = 4$ |
| | DDC b | | |
| | $t_{arr} = 32$ | | |
| | $t_{diff} = 24$ | | |
| | $T_r = 6$ | | |
| | $t_r = 2$ | | |
| | DDC c | | |
| | $t_{arr} = 37$ | | |
| | $t_{diff} = -1$ | | |
| | $T_r = 12$ | | |
| | $t_r = 1$ | | |
| | DDC d | | |
| | $t_{arr} = 43$ | | |
| | $t_{diff} = -5$ | | |
| | $T_r = 15$ | | |
| | $t_r = 4$ | | |
| | DDC e | | |
| | $t_{arr} = 54$ | | |
| | $t_{diff} = 44$ | | |
| | $T_r = 29$ | | |
| | $t_r = 1$ | | |
| | | Region 3 | |
| | | $T_{strt} = 38$ | |
| | | $T_{reg} = 10$ | |
| | | Region 4 | |
| | | $T_{strt} = 48$ | |
| | | $T_{reg} = 4$ | |

Figure 14E:
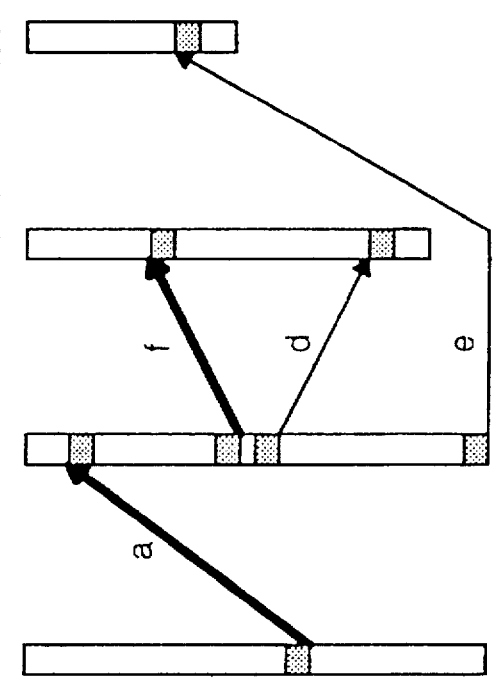

The upward arrow in FIGS. 14B-E indicates the task that is the current focus. This starts at the maximum execution time (MET) task shown in FIG. 14B and proceeds backward along the dominant chain until the first task in the chain is found as shown in FIG. 14C. Note that the bold arrows in FIGS. 14B-E indicate the current dominant chain in the system. The section of the task (Task A) that is above the outgoing message (a) in the chain is searched for possible merges. In this example, there are no messages leaving that section of Task A, so the next task in the chain becomes the focus as shown in FIG. 14D. The section of Task B that is between the incoming and outgoing messages in the chain is searched for possible merges. Three messages are in that section. Message pair b-c is checked for mergeability (see the definition of mergeable in the discussion of Mergeable Data Dependence Clusters) first, since it is the highest pair (i.e. it is above all other pairs) in the appropriate section of Task B. This helps ensure that the positive effect of a merge on the source task will be spread to as many other DDCs as possible. The effect that this merge will have on the system is checked by comparing its data values against those in Tables 1 and 2. This merge will cause an increase in the execution time of Task C, but the change in tarr value seen ($\Delta t_{arr}(b,c)=7$) plus the total execution time of the task (51) is not greater than the current maximum execution time of the system. This indicates the possibility that this merge will not increase the execution time. A recalculation of the regional and dependence related data shows that the merge will reduce the execution time down to 57, so the merge is performed as shown in FIG. 14E. This makes Task C the maximum execution time (MET) task.

Figure 14F:
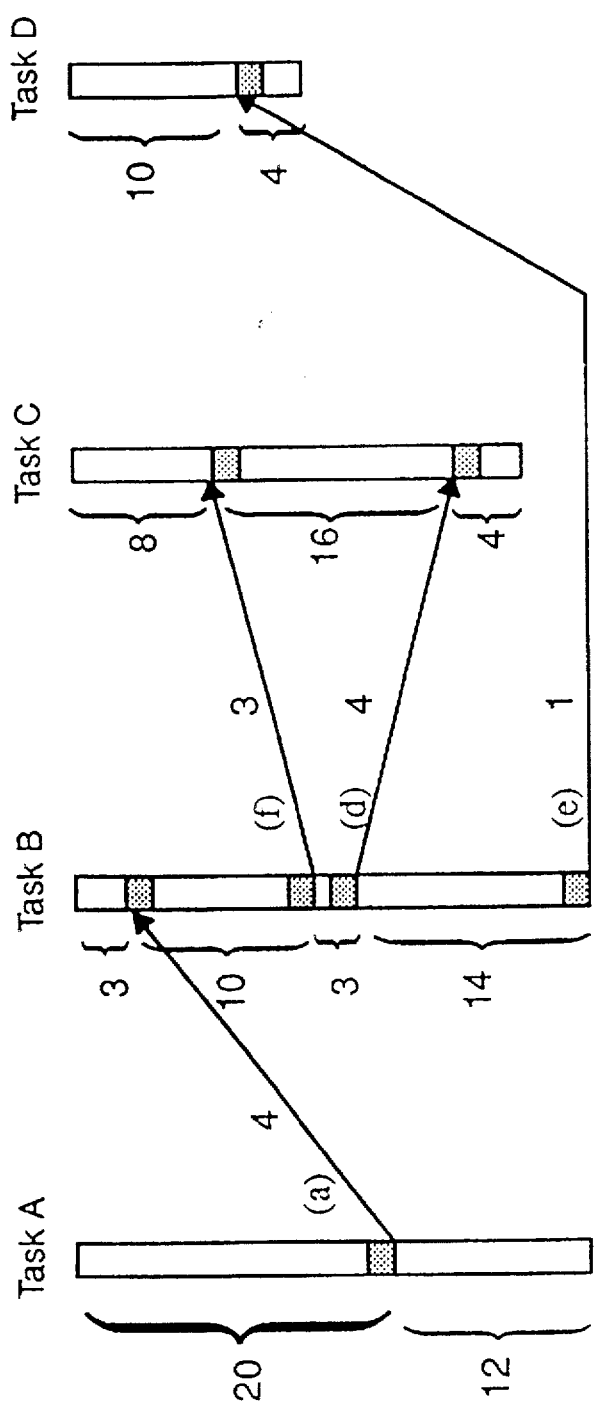

This process is now repeated starting with the new MET task. Since there are no more pairs of DDCs that might be merged anywhere along the current dominant chain, no merge is performed and the process halts. FIG. 14F shows the final state of the system with the new values for all data shown in Table 5.

TABLE 5

| Task A | Task B | Task C | Task D |
|---|---|---|---|
| Region 1 | Region 1 | Region 1 | Region 1 |
| $T_{strt} = 0$ | $T_{strt} = 0$ | $T_{strt} = 0$ | $T_{strt} = 0$ |
| $T_{reg} = 32$ | $T_{reg} = 3$ | $T_{reg} = 8$ | $T_{reg} = 10$ |
| DDC a | | | |
| $t_{arr} = 24$ | | | |
| $t_{diff} = 21$ | | | |
| $T_{r} = 20$ | | | |
| $t_t = 4$ | | | |
| | Region 2 | Region 2 | Region 2 |
| | $T_{strt} = 24$ | $T_{strt} = 37$ | $T_{strt} = 52$ |
| | $T_{reg} = 27$ | $T_{reg} = 16$ | $T_{reg} = 4$ |
| | DDC f | | |
| | $t_{arr} = 37$ | | |
| | $t_{diff} = 29$ | | |
| | $T_{r} = 10$ | | |
| | $t_t = 3$ | | |
| | DDC d | | |
| | $t_{arr} = 41$ | | |
| | $t_{diff} = -12$ | | |
| | $T_{r} = 13$ | | |
| | $t_t = 4$ | | |
| | DDC e | | |
| | $t_{arr} = 52$ | | |
| | $t_{diff} = 42$ | | |
| | $T_{r} = 27$ | | |
| | $t_t = 1$ | | |
| | | Region 3 | |
| | | $T_{strt} = 53$ | |
| | | $T_{reg} = 4$ | |

While determining the dominant chain is the preferred method of performing the present invention, since it is likely that merges found along the dominant chain will be likely to reduce the overall execution time, it is possible to simplify the process by not determining the dominant chain and just searching for all consecutive messages and evaluating each one found according to the previously described criteria. After a beneficial merge is found and the send and receive statements combined, the regional areas are redetermined and the start and stop times of all regions are recalculated. Consecutive messages after the last merge are continued to be evaluated until all the paths have been checked for consecutive messages and no additional beneficial merges have been found.

Figure 16:
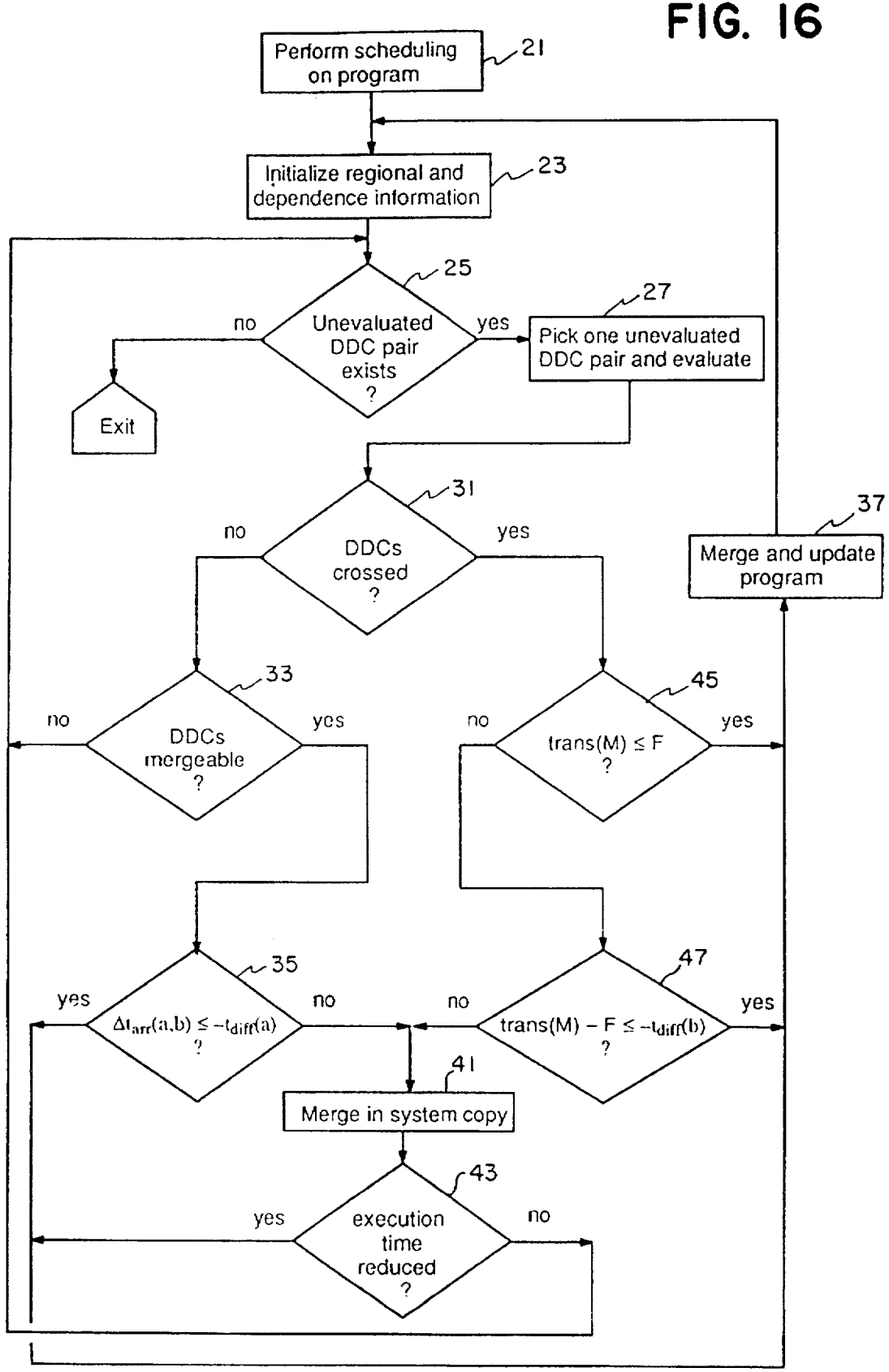
FIG. 16 is a flow chart showing the steps in accordance with the present invention for determining when to merge messages in a program to be used in a multiprocessor system.

FIG. 16 shows a flow chart for determining beneficial merges in a program to be used in a multiprocessor system. The program to be optimized is first scheduled in block 21. Next, regional and dependence information is initialized in block 23, this includes determining arrival times, differential times for dependencies and start times for each of the regions. In decision block 25, a message pair is searched for. A message pair consists of two consecutive outgoing messages to a second processor sent from a first processor, where outgoing messages are considered to be consecutive when considering only messages going to the same processor. Therefore, if a first message from a first processor goes to a second processor, a second message from the first processor goes to a third processor, and a third message goes to the second processor, with the first, second, and third messages reached successively during program execution, then the first and third messages will be considered to be consecutive. If a message pair is found in decision block 25, then the message pair selected in block 27 is checked to see if the pair is crossed in decision block 31. Crossed messages have a receive statement whose message is sent first from the first processor being located after the receive statement in the order of execution. The receive statement receiving the outgoing message form the second consecutive outgoing message. For the non-crossed messages it is determined in decision block 33 whether or not there is a path that originates between the two receive statements of the consecutive messages being considered for merging. If the path exists, the messages are not merged, thereby avoiding a deadlock situation. For non-crossed messages which do not produce a deadlock, a determination is made whether the start time of the portion of the program waiting for the receive statement message is delayed in decision block 35. If no delay would occur, the program is modified by merging the consecutive messages being evaluated in block 37. If however, the start time of the portion of the program waiting for the receive statement message is delayed, the difference in execution time with and without the merge taking place is determined by performing the merge in a copy of the program 41 and merging if it is determined that the execution time of the program is not increased in block 43. The merge can be performed even if the execution time stays the same since it may help reduce channel contention delays.

For messages in decision block 31 determined to be crossed, the time it takes to send a first message compared to the flat overhead associated with a send statement is determined in block 45. Flat overhead is associated with every send statement and is the time it takes to get ready to send the message, and includes any system calls, copying data into I/O buffers, etc. The flat overhead is a constant and when added to the time to send the message it gives the total communication time associated with a message. If the time to send the message (not including the flat overhead) is less than or equal to the flat overhead, the program is modified by performing the merge in block 37. When the time to send the message is greater than the flat overhead, whether the change in arrival time at the first receive statement before and after the merge, delays the start time for the portion of the program waiting for the receive statement message is determined in block 47 and if no delay the merge is performed in block 37. If a delay occurs, the merge is performed in the system copy in block 41 and the execution time checked in block 43. After exhausting the unevaluated pairs the process is complete.

Figure 15:
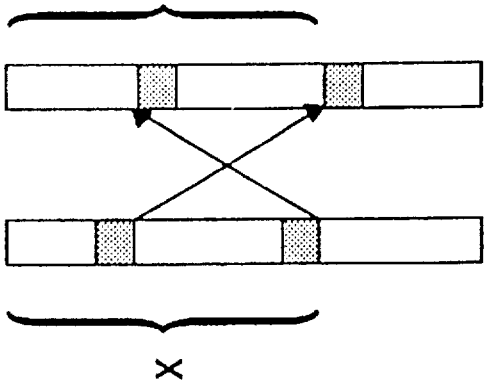
FIG. 15 is a task graph showing crossed data dependence clusters. The regions labelled x have to have been allocated to processing elements to permit checking for merging before the task allocation portion of scheduling is complete.

Although it has been stated that this invention works as a post-scheduling tool, other ways of using this message merging technique exist. Schedulers for parallel processors, in general, have two main functions. Their first job is to allocate each task in the task graph to a processing element (PE) in the target machine. Secondly, they allocate messages between PEs to the communication channels in the machine. Before tasks are allocated to processors, there is no possibility of merging messages. Arrows in the task graph indicate communication between two tasks, but if two tasks are allocated to the same PE, they can exchange data through the memory of that PE. No message is necessary. The information about whether communication between two tasks is taking place with the tasks being on the same or different PEs is required before any merging can take place. It is possible, however, to merge before all the tasks have been allocated to a PE, but only in very specific cases. For example, before non-crossed messages can be merged, they must pass the test of mergeability. To know whether a pair of (non-crossed) messages is mergeable, it is necessary to determine if a chain of DDCs exists from between their receive statements in the sink task to between their send statements in the source task. Without knowing in which PEs all the tasks reside, it cannot be determined whether such a chain exists. Thus, non-crossed DDCs cannot be merged before all tasks have been allocated to PEs. Crossed DDCs, on the other hand, do not have to meet that test of mergeability, as explained previously. This allows them to be merged before all the tasks have been allocated to PEs. As long as the tasks included in both sections marked X in FIG. 15 have been allocated to the PEs indicated, DDCs a and b can be checked for merging. Note that in this case, since not all tasks have been allocated yet, only those DDC pairs that fit Cases 4 and 5 from Table 3 will be able to be merged. Case 6 DDC pairs require that the execution time after the merge be checked to make sure that it is less than the execution time before the merge. If this isn't true, the merge will not be performed. Since doing that check is not possible before all the tasks have been allocated, these types of merges cannot be performed here.

The next possibility for incorporating the merging technique into a scheduler would be to merge between task allocation and channel allocation. Since all tasks have been allocated at this point, the full range of merging techniques is available for use. Depending on the routing strategy used by the target machine, however, it might be necessary to use an estimate of the transmission time of the inter-PE communications. This is due to not knowing how many processors must be traversed by each message before it arrives at its destination. In some machines, this would add to the total communication time of the message.

The final alternative to the merging technique described by this invention is to merge as the communication channels are being allocated. This would provide better transmission times for those messages with allocated channels, but would still require the estimates for all messages with as yet unallocated channels.

The foregoing has described a method for optimizing interprocessor communication in programs for distributed memory multiprocessors. The task graph containing the already scheduled tasks and the communication structure is used as input. The basic approach combines two (or more) messages into one message with the explicit goal of reducing the overall execution time, taking into account direct and indirect dependencies among the concurrent units. All merged messages must originate in the same PE and terminate in the same PE. The end result of a merge is one communication that preserves all the data dependencies that existed prior to the merge being performed.

While the invention has been particularly shown and described with reference to several embodiments thereof, it will be understood by those skilled in the art that various changes in form and details may be made therein without departing from the spirit and scope of the invention.

What we claim is:

1. A method of determining which messages in a program for a distributed memory parallel processor system can be merged without causing deadlock of the system when the program is run, comprising the steps of:
   (a) determining regions in the code allocated to each processor, where new regions begin at the receive statements of entering messages;
   (b) identifying two consecutive outgoing messages to a second processor and sent from a first processor, where outgoing messages will be consecutive when considering only messages going to the second processor;
   (c) checking if the two consecutive messages are crossed, with crossed messages having a first receive statement whose message is sent first from the first processor, said first receiving statement being located after the receive statement which is to receive the outgoing message from the second consecutive outgoing message; and
   (d) determining for non-crossed messages whether there is a chain that originates between the two receive statements and terminates between the two send statements for the consecutive messages being considered for merging and not merging the messages if such a path is found, thereby avoiding deadlock.

2. A method carried out on a computer of merging two or more messages of a program for a distributed memory parallel processor system, so that the messages can be sent as one message to reduce the overall computation time and bus loading of the system while running the program, after the program that has been scheduled, comprising the steps of:
   (a) determining regions in the program code allocated to each processor, where new regions begin at the receive statements of entering messages;
   (b) estimating start time of each region based on whether it takes longer for the execution of the previous region to be completed than for the message to arrive which defines the beginning of the region, or if it takes longer for the message to arrive which defines the beginning of the region than the time the previous region takes to complete its execution;
   (c) identifying two consecutive outgoing messages from a first processor to a second processor, where outgoing messages will be consecutive when considering only messages going to the second processor;
   (d) checking if the two consecutive messages are crossed, with crossed messages having a first receive statement whose message is sent first from the first processor, the first receive statement being located after the receive statement which is to receive the outgoing message from the second consecutive outgoing message; and
   (e) determining for non-crossed messages whether there is a chain that originates between the two receive statements and terminates between the two send statements for the consecutive messages being considered for merging and not merging the messages if such a path is found, thereby avoiding deadlock.

3. The method of claim 2, further comprising the steps of:
   determining for non-crossed messages that would not produce a deadlock whether the start time of the portion of the program waiting for the combined receive statement message is delayed;
   modifying the program by merging the consecutive messages if no delay occurs.

4. The method of claim 3 further comprising the steps of:
   determining the difference in execution time with and without the merge which caused a delay of the start time; and
   modifying the program by performing the merge if the execution time was not increased.

5. The method of claim 2 further comprising the steps of:
   determining for crossed messages the time it takes to send a first message compared to the flat overhead associated with a send statement; and
   modifying the program by performing the merge if the time to send the message is less than or equal to the flat overhead.

6. The method of claim 5, further comprising the steps of:

determining for crossed messages where the time to send the message is greater than the flat overhead, whether the change in arrival time at the first receive statement before and after the merge, delays the start time for the portion of the program waiting for the receive statement message;

modifying the program by performing the merge if no delay occurs.

7. The method of claim 6, further comprising the steps of:

determining the difference in execution time with and without the merge which caused a delay of the start time; and modifying the program by performing the merge if the execution time was not increased.

* * * * *